United States Patent [19]
Chanter et al.

[11] Patent Number: 5,062,647
[45] Date of Patent: Nov. 5, 1991

[54] TOY SIMULATOR

[75] Inventors: Edward G. Chanter, Lakewood, Ohio; Randy J. Randleman, Stillwater, Minn.

[73] Assignee: Those Characters from Cleveland, Inc., Cleveland, Ohio

[21] Appl. No.: 460,766

[22] Filed: Jan. 4, 1990

[51] Int. Cl.⁵ .............................................. A63F 9/14
[52] U.S. Cl. ...................................................... 273/442
[58] Field of Search ......... 273/1 GA, 1 GB, 441–443; 434/62–65, 32

[56] References Cited

U.S. PATENT DOCUMENTS

| | | | |
|---|---|---|---|
| 2,265,598 | 12/1941 | Firestone | 273/1 GA |
| 2,806,323 | 5/1954 | Oback . | |
| 2,943,855 | 3/1956 | Javna et al. | 273/1 GA |
| 3,657,457 | 4/1972 | Poynter . | |
| 3,715,832 | 2/1973 | Torres . | |
| 3,722,884 | 3/1973 | Brown | 273/1 GA |
| 4,167,822 | 9/1979 | Weir et al. . | |
| 4,174,833 | 11/1979 | Hennig et al. | 273/1 GA |
| 4,212,459 | 7/1980 | Wolf | 273/1 GA |
| 4,231,571 | 11/1980 | Watanabe | 273/1 GA |
| 4,270,306 | 6/1981 | Klawitter | 273/1 GA X |
| 4,340,219 | 7/1982 | Saito et al. | 273/1 GA |
| 4,589,660 | 5/1986 | Tsuzuki | 273/1 GA |
| 4,856,777 | 8/1989 | Hirose et al. | 273/1 GA |

FOREIGN PATENT DOCUMENTS 364204 10/1962 Switzerland .................... 273/1 GA Primary Examiner—Paul E. Shapiro
Attorney, Agent, or Firm—Calfee, Halter & Griswold

[57] ABSTRACT

A toy for testing and simulating the guidance skills of a user is provided. The toy includes a support unit for removably mounting the toy drum upon the limb of the user and a circular drum removably mounted for rotational upon said support unit. A travel path is formed upon the outer diameter of the drum and a travel element is positioned above the drum. A control mechanism is provided for altering the position of the travel element relative to the travel path. In operation, a motor rotates the drum in a first direction and an opposite direction relative to the support unit and a circuit selectively controls the rotation direction of the motor.

18 Claims, 6 Drawing Sheets

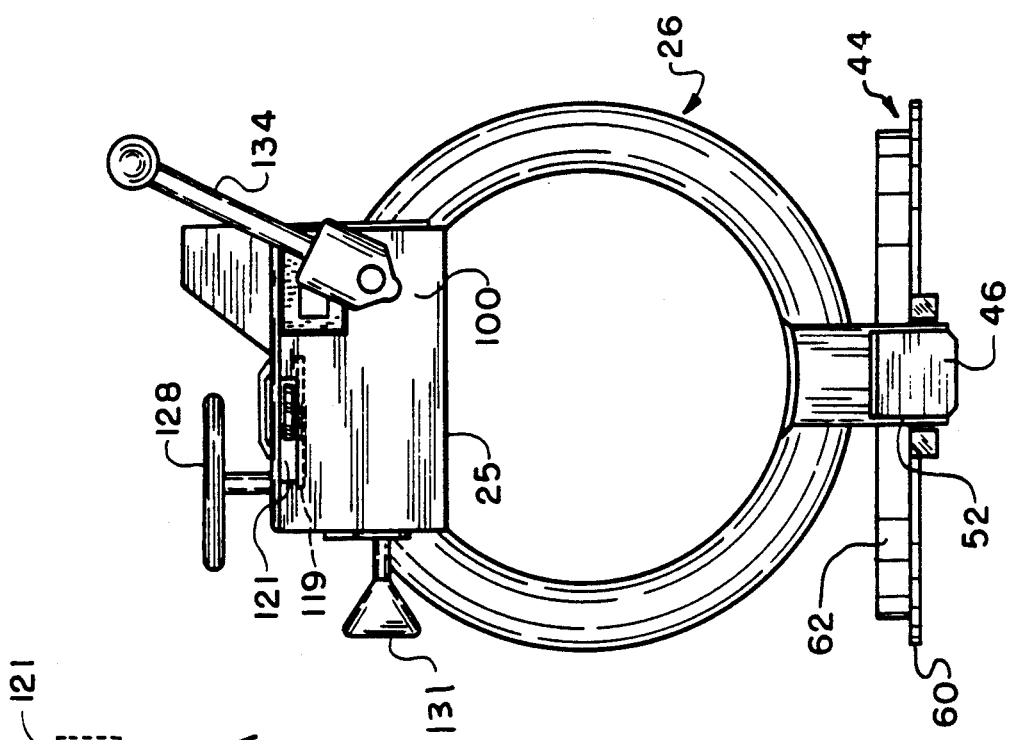
FIG. 4
FIG. 3A
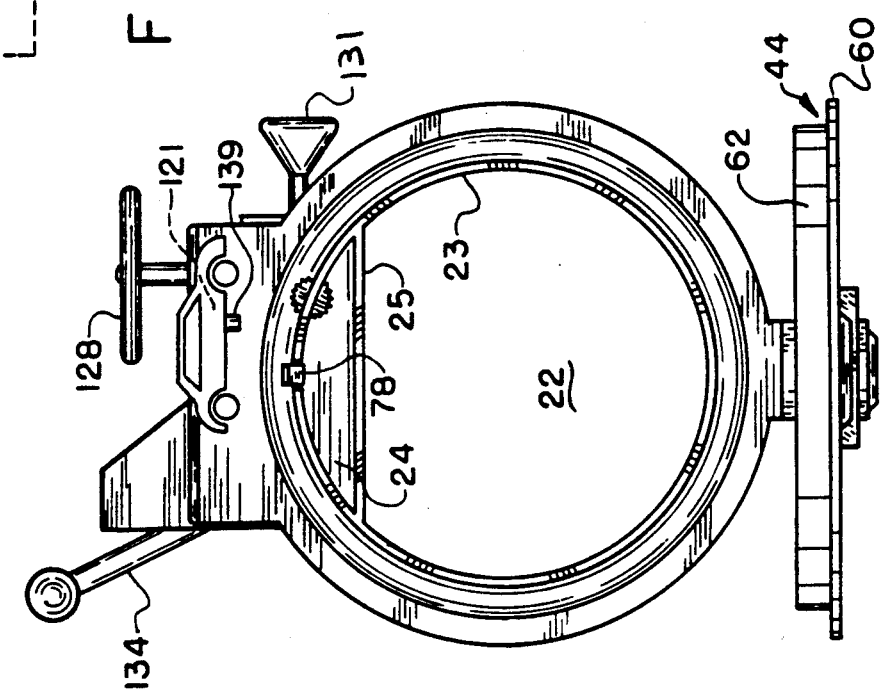
FIG. 3

TOY SIMULATOR

DISCLOSURE

This invention relates to the art of games and toys. More particularly, this invention concerns a toy for simulating and testing the driving or guidance skills of a user.

BACKGROUND

The prior art provides several games or toy devices for simulating and testing the driving or guidance skills of a user. An example of such a device is disclosed in Weir, et al. U.S. Pat. No. 4,167,822. This device utilizes an endless belt having various image forming elements positioned thereon. A light source that is capable of lateral movement forms images of the image forming elements on a screen thereby simulating a driving environment.

Another device that employs an endless belt may be found in Javna, et al. U.S. Pat. No. 2,943,855. This device comprises an adjustably movable toy airplane that is positioned above an endless belt that simulates a flight path.

Other devices such as that disclosed in Poynter U.S. Pat. No. 3,657,457 and Oback U.S. Pat. No. 2,806,323 disclose games or toys having travel paths along which toy vehicles are manipulated using movable magnets located beneath the travel paths.

SUMMARY OF INVENTION

The present invention provides a totally unique game or toy device for simulating and testing the driving skills of a user.

In a preferred embodiment the toy includes generally a drive unit and a support unit. The support unit facilitates attachment of the toy to a user's forearm and it supports for rotation a circular drum. An endless travel path is formed on the outside diameter or surface of the drum by a plurality of protruding obstacles. The support unit is designed in such a manner as to be capable of receiving and supporting any one of a variety of drums having different travel paths formed thereon.

Supported just above the drum by the drive unit is a travel element such as a toy or model car. The drive unit includes an electric motor for rotating the drum and thus the travel path in a first (counterclockwise or forward) direction and a second (clockwise or reverse) direction. The electric motor is powered by a replaceable conventional battery located in the support unit. The drive unit also includes a steering assembly for altering the position of the travel element above the travel path and an electric circuit including various electrical switches for controlling the motor.

The electric circuit is partially completed by turning a switch that simulates an ignition key to the "on" position A lever connected to another switch is then manipulated forward from a "neutral" or "off" position to a first "on" position. When the user depresses the steering wheel of the steering assembly, thereby completing the electrical circuit, the drum and thus the travel path are rotated in the first direction. The user then utilizes the steering wheel of the steering assembly to manipulate the travel element in such a manner as to avoid contact between the travel element and the obstacles. In the event the travel element contacts an obstacle, the electric motor is automatically electrically disconnected and the rotation of the travel path is terminated. At this point, the user must then manipulate the lever connected to the switch rearwardly to a second "on" position, so as to reverse the rotational direction of the motor and thus the travel path. This allows the user to disengage the travel element from the obstacle. Then, upon further manipulation of the lever to the forward position, a user may once again start the travel path moving in the original or first direction of rotation and steer or maneuver the travel element around the obstacle.

As the user acquires more skill in operating the toy the user is less likely to contact an obstacle. Once the user has become fully skilled at operating the toy, the user may be able to complete a full revolution of the drum or travel path without contacting any obstacles whatsoever, thereby minimizing the amount of time required to complete a full revolution of the drum. Multiple users may use the toy on a competitive basis in order to determine which user is capable of completing one or more laps or revolutions of the drum in the minimum amount of time.

The foregoing and other features of the invention are hereinafter more fully described and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF DRAWINGS

FIG. 3 is a left side view of the toy of FIG. 1 with the end cap pivoted down and the drum removed from the support unit;

FIG. 3A is a magnified broken away view of the area generally indicated in FIG. 3;

FIG. 4 is a right side view of the toy of FIG. 1 with the end cap pivoted down;

DETAILED DESCRIPTION OF THE PREFERRED EMBODIMENT

Figure 1:
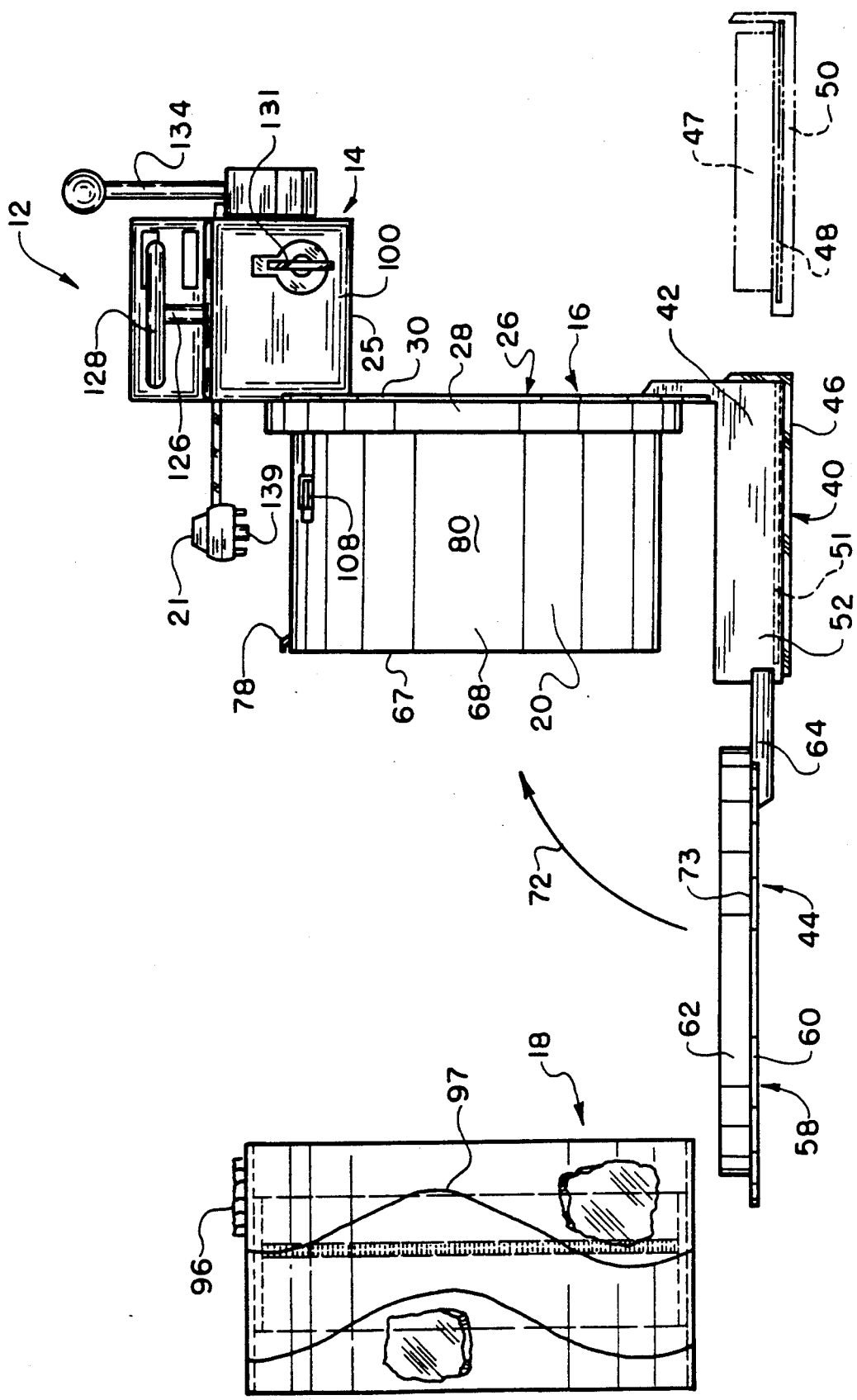
FIG. 1 is a front assembly or plan view of a toy made in accordance with the present invention with the end cap pivoted down and the drum removed from the support unit.
Figure 2:
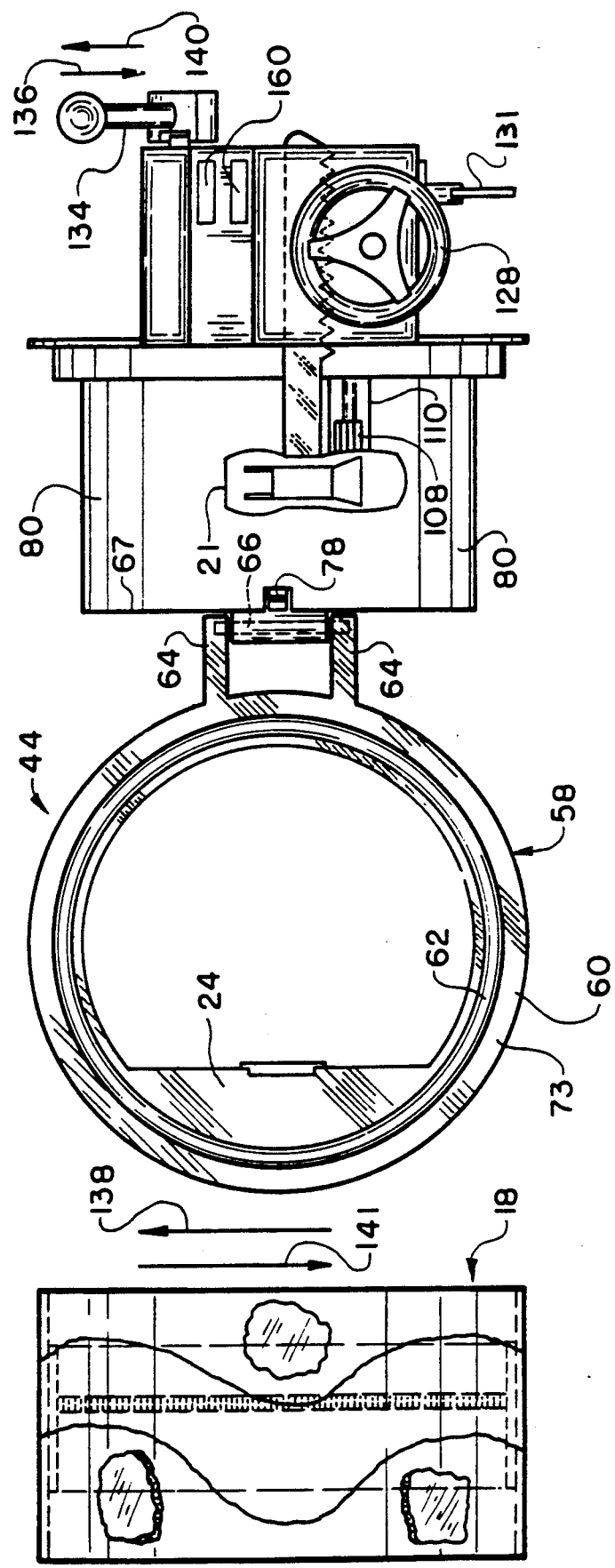
FIG. 2 is a top assembly or plan view of the toy of FIG. 1 with the end cap pivoted down and the drum removed from the support unit.
Figure 5:
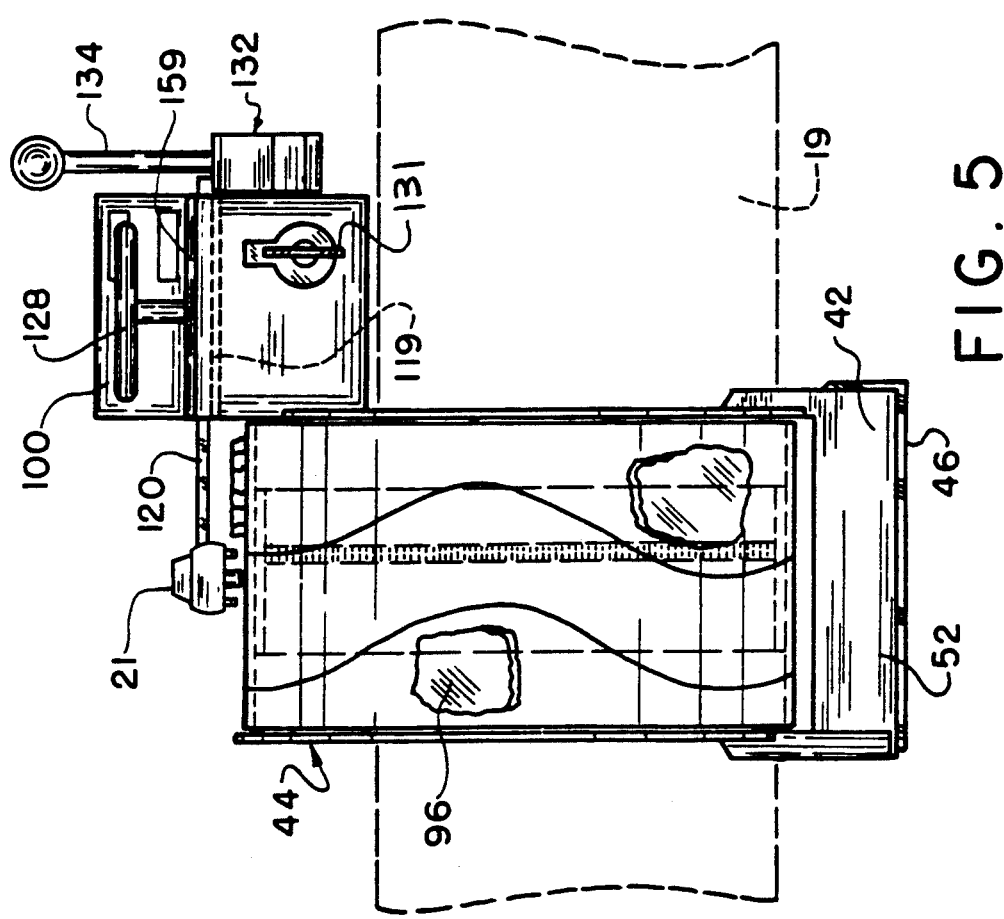
FIG. 5 is a front view of the toy of FIG. 1 with the drum positioned on the support unit and end cap in the up and locked position.

Referring to the drawings, and initially to FIGS. 1, 2 and 5 there is illustrated a totally unique game or toy device 12 for testing and simulating the guidance or driving skills of a user made in accordance with the principles of the present invention.

Generally, toy 12 includes a drive unit 14, a support unit 16 and a drum 18. The support unit 16 serves to release, engage and support the drum 18. The drive unit 14 serves to rotate the drum 18 upon the support unit 16.

Drive unit 16 also serves to adjustably support a travel element or toy car 21 that is positioned slightly over or above drum 18 when drum 18 is properly positioned on the support unit 16 as shown in FIG. 5.

Support unit 16 includes a circular axle 20 upon which drum 18 is supported for rotation. Axle 20 includes an opening 22 that allows the axle 20 to be slipped over a user's hand. More particularly, with the drum 18 positioned on axle 20, the axle 20 may be slipped over a user's hand and then moved up along the user's forearm 19 until the inner wall 23 and flange 24 of the support unit 16 and the bottom wall 25 of the drive unit 14 frictionally engage the user's forearm 19, thereby securely mounting the toy 12 upon the user's forearm 19 as shown in FIG. 5. As explained in greater detail below, once the toy 12 is secured to a user's forearm 19, the toy 12 is energized causing the drum 18 to rotate. The position of the car 21 is then manipulated or adjusted by the user thereby simulating the driving of an automobile along a pathway or roadway.

Figure 6:
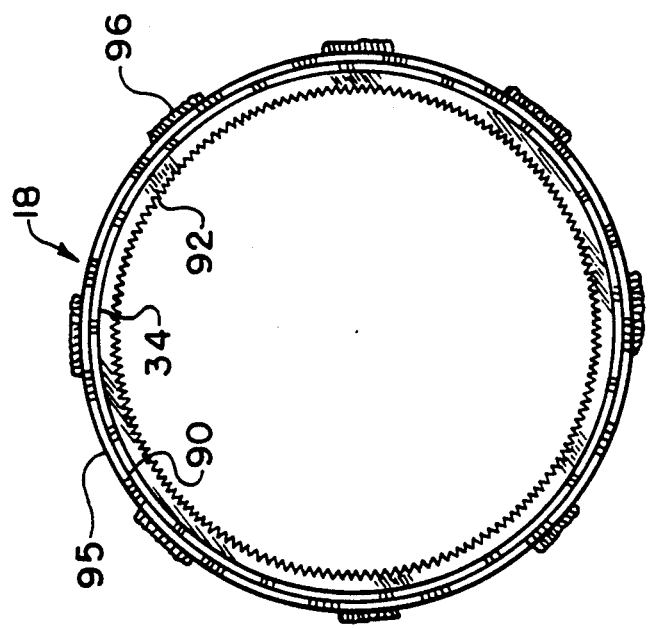
FIG. 6 is a side view of the drum of FIG. 1.

Axle 20 includes a rim 26 formed along its inner edge. Rim 26 includes a protruding circular bearing 28 and an upstanding lip 30. Upon placement of the drum 18 on axle 20, the inboard edge of the inner annular surface 34 (indicated in FIG. 6) of the drum 18 rides along and is supported by the circular bearing 28, while the lip 30 serves to help prevent the lateral movement of the drum 18 on the axle 20.

Mounted along the bottom or lower portion of rim 26 is an end cap assembly 40. End cap assembly 40 includes a battery compartment 42 having pivotally mounted at its distal end an end cap 44. Battery compartment 42 includes a removable cover 46 for allowing a user to insert, remove and replace a conventional "AA" size battery 47 which serves as an electrical power source for the toy 12. As shown in FIG. 1, cover 46 includes rails 48 that extend from the lateral edges of the bottom leg 50 of the cover 46. Formed in side walls 52 of the compartment 42 are grooves 51. Cover 46 is securely attached to compartment 42 by inserting rails 48 into grooves 51.

As shown in FIG. 2, end cap 44 includes a circular rim 58 having an upstanding lip 60 and a circular bearing 62. Extending from the lip 60 are a pair of struts 64. Pivotally connecting the struts 64 to the distal end of the battery compartment 42 is a pivot pin 66. Pin 66 allows the end cap 44 to pivot in the direction generally indicated by arrow 72 shown in FIG. 1.

Once the drum 18 is placed upon the axle 20, the end cap 44 is pivoted by a user upwardly towards the axle 20. More particularly, the upstanding lip 60 of the end cap 44 is positioned immediately adjacent the outer edge 67 of axle 20 such that the end portion 68 of axle 20 is received within the confines of circular bearing 62 and the outer edge 67 of the axle 20 abuts the inner surface 73 of the upstanding lip 60. End cap 44 is held in releasable frictional engagement with axle 20 by protruding tab 78 which clamps the circular bearing 62 of the end cap 44 securely against the outer diameter or surface 80 of the axle 20. In this position, the drum 18 is held securely upon the axle 20, the upstanding lip 60 serving to limit the lateral or horizontal movement of the drum 18.

Drum 18 includes an inner surface 90 having mounted thereon an annular or continuous rack 92. Mounted on the outer surface 95 of drum 18 are multiple upwardly extending or protruding obstacles 96. Obstacles 96 serve to form a travel path or roadway or contour generally designated 97. Obstacles 96 may simulate anyone of a variety of objects such as, for example, trees, embankments, mountains, other vehicles or the like. Similarly, the present invention contemplates the use of any one of a variety of travel elements and is in no way limited to the illustrated toy car 21. For example, such alternative travel elements may comprise a model tank, airplane, bus, truck or the like. Thus, depending on the type of obstacles and travel elements utilized, any one of a variety of driving type activities may be simulated, such as, for example, driving a bus, flying a plane or spaceship, or navigating a submarine or boat.

Figure 8:
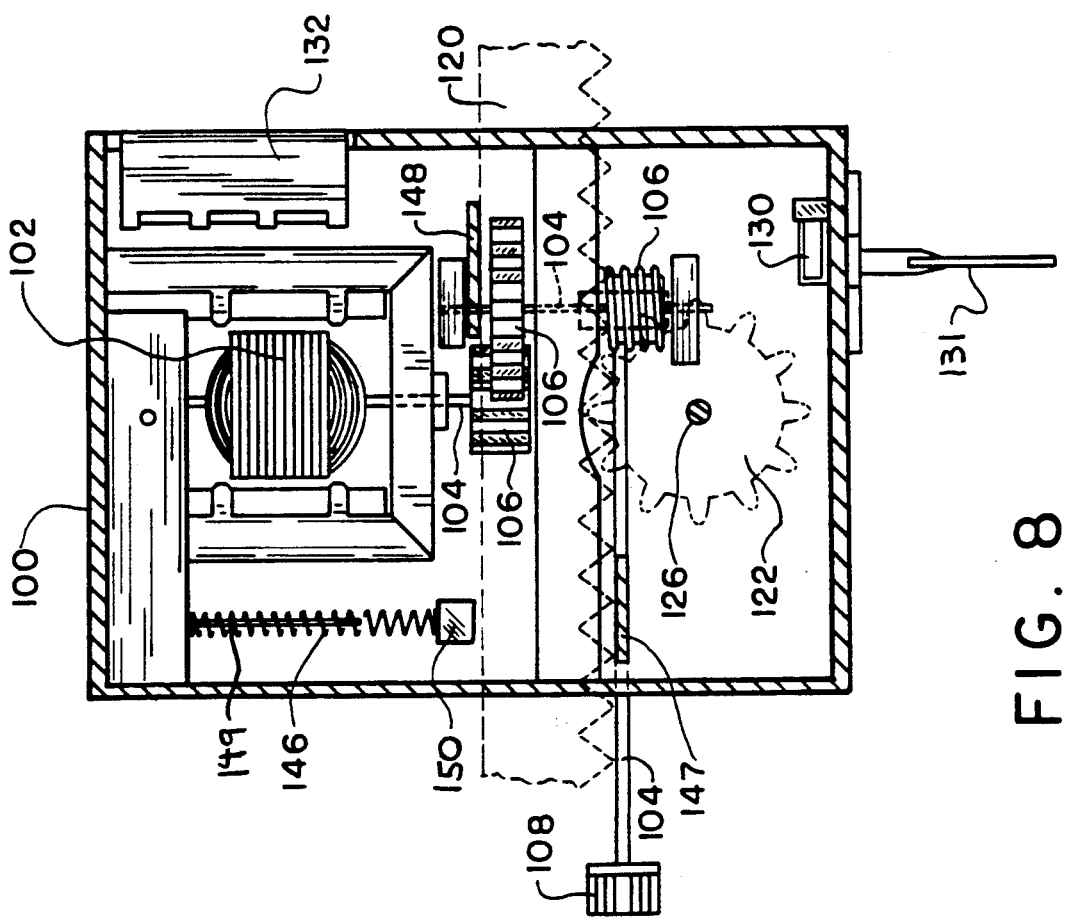
FIG. 8 is a broken away top view of the drive unit of the toy of FIG. 1.

As shown in FIG. 8, drive unit 14 includes a housing 100 that contains a direct current motor 102 that through multiple shafts 104 and gears 106 drives a pinion gear 108 which is positioned within and extends slightly above slot 110 formed in axle 20. Upon placement of the drum 18 on axle 20 the pinion gear 108 engages the rack 92 allowing the gear 108 to drive the rack 92 and thus rotate the drum 18. Although a particular arrangement of gears is illustrated in FIG. 8, it will be appreciated that the present invention contemplates the use of any one of a variety of alternative gear arrangements or configurations that transmit the rotational energy of the motor 102 to the drum 18.

Partially contained within housing 100 is steering rack 120. Steering rack 120 is partially supported upon a platform 119 that extends from the end walls of housing 100 and is located beneath rack 120 as shown in FIGS. 4 and 5. Steering rack 120 extends through a pair of slots 121 formed in housing 100 that are about the same height or thickness as rack 120 and almost twice as wide as rack 120. Steering rack 120 supports toy car 21 above or over the drum 18. Engaging steering rack 120 is steering pinion gear 122. Secured for rotation, at its distal end in the bottom wall 25 of the housing 100, is steering shaft 126. Steering shaft 126 extends through and is attached to steering pinion gear 122. Steering shaft 126 is also attached at one of its ends to steering wheel 128. Steering shaft 126 is connected at its other end to an electrical switch 129 (schematically shown in FIG. 9) that is biased in the "off" position and which is placed in the "on" position by depressing the steering wheel 128.

The horizontal position of steering rack 120, and thus toy car 21, is determined by steering pinion gear 122 and steering wheel 128. More particularly, when steering wheel 128 is turned or rotated clockwise, and steering pinion 122 is thus rotated clockwise, the steering rack 120 and the toy car 21 are moved to the right as viewed in FIG. 2. Similarly, when steering wheel 128 is rotated counterclockwise, and steering pinion 122 is thus rotated counterclockwise, the steering rack 120 and the toy car 21 are moved to the left as viewed in FIG. 2.

Motor 102 is energized by first turning or rotating the key 131 of switch 130, which simulates the ignition key of an automotive ignition system, in the clockwise direction as viewed in FIG. 1 to an "on" position. Then, switch 132 (which comprises a double pole triple throw switch having a "neutral" or center "off" position) must be manipulated out of the center "off" position. More particularly, moving the lever 134 which is attached to switch 132 forward as indicated by arrow 136 in FIG. 2 to a first "on" position and depressing upon the steering wheel 128 (which closes an electrical circuit with switch 129 that is normally biased in the open position) results in the motor 102 rotating in a first or forward direction causing the drive pinion 108 to drive the drum 18 in a counterclockwise direction (as viewed from the end cap 44 in the direction indicated by arrow 138 in FIG. 2). Moving the lever 134 of switch 132 rearwardly as indicated by arrow 140 to a second "on" position and depressing upon the steering wheel 128 results in the motor 102 rotating in a second or reverse direction causing the drive pinion 108 to drive the drum 18 in a clockwise direction (as viewed from the end cap 44 in the direction indicated by arrow 141 in FIG. 2).

As drum 18 rotates in the forward or counterclockwise direction, a user utilizing steering wheel 128 can manipulate the toy car 21, which is positioned immediately above the outer surface of drum 18, to the right or left of the obstacles 96 formed on drum 18 as viewed in FIG. 5. Upstanding lips 30 and 60, in addition to limiting the horizontal or lateral movement of the drum 18, also serve to limit the horizontal or lateral movement of the toy car 21.

Figure 7:
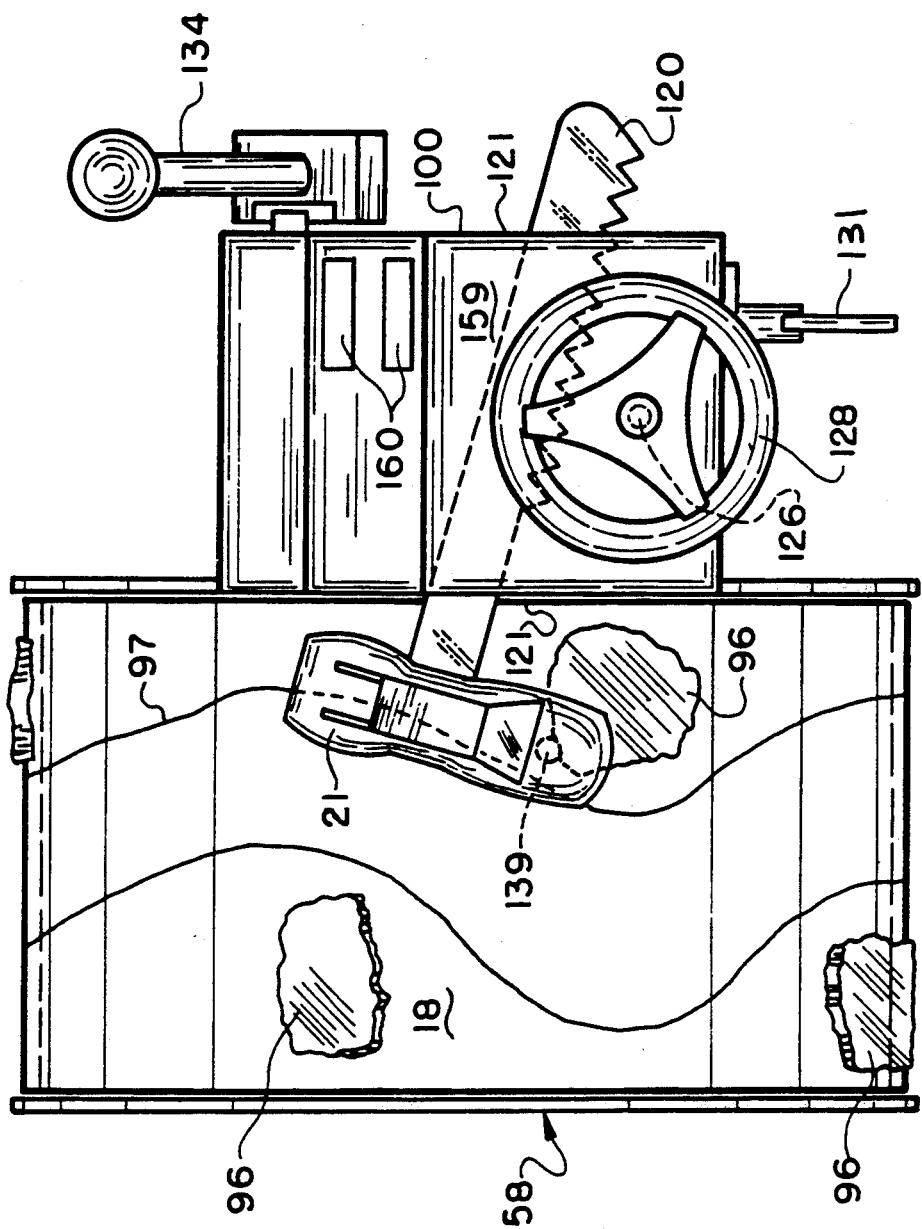
FIG. 7 is a top view of the toy of FIG. 1 with the travel element in contact with one of the travel path obstacles.

Steering rack 120 is biased in a forward position in engagement with pinion gear 122 as shown in FIG. 8 by spring assembly 146 against inner guide walls 147 and 148 which extend downwardly from the top 159 of housing 100. In the event the protruding pin 139 of model car 21 contacts an obstacle 96 as shown in FIG. 7, steering rack 120 is pivoted rearwardly about inner guide wall 148 which extends upwardly from the base of housing 100. Inner guide wall 148 helps to ensure that steering rack 120 maintains its engagement with steering pinion gear 122 while steering rack 120 pivots. Simultaneously therewith, steering rack 120 is pushed rearwardly against reed switch 150 which causes switch 150, which is normally biased in an "on" position or closed position, to break the electrical circuit to motor 102 thereby immediately and automatically discontinuing the forward or counterclockwise rotation of drum 18. Switch 150 is held in position adjacent rack 120 by spring 146 and rod 149.

When switch 150 is tripped however, it does not disrupt the electrical circuit as far as allowing the motor 102 to be powered in the reverse or clockwise direction, and thus the drum 18 may be rotated in the clockwise direction after switch 150 is tripped. More particularly, after the toy car 21 has contacted the obstacle 96 and the switch 150 has been tripped thereby disabling motor 102, the user can manipulate lever 134 rearwardly to the second "on" position, and then depress the steering wheel 128 thereby completing the electrical circuit so as to cause the drum 18 to rotate in the clockwise direction. This spaces the toy car 21 from the obstacle 96 and allows the steering rack 120 to return to its unbiased forward position wherein the switch 150 is no longer tripped. A user may then rotate steering wheel 128 and reposition the toy car 21 so that when lever 134 is forwardly manipulated to the first "on" position and the steering wheel 128 is depressed and drum 18 rotates in the counterclockwise direction, the protruding pin 139 of the toy car 21 avoids and thus does not contact obstacle 96. Although lever 134 may be manipulated rearwardly to the second "on" position to cause the drum 18 to rotate in the clockwise direction after switch 150 is tripped, the rearward manipulation of lever 134 to the second "on" position and the depression of steering wheel 128 will cause the clockwise rotation of drum 18 even when switch 150 is not tripped.

Generally, the more skilled the user of toy 12 is, the less likely the pin 139 of the toy car 21 is to contact one of the obstacles 96. If the user is sufficiently skilled, the user can avoid contacting the pin 139 of the toy car 21 with an obstacle for one or more rotations of the drum 18. Of course, the skill required to manipulate the position of toy car 21 is a function of the obstacle course or pathway 97 created by the obstacles 96 on drum 18. Since drum 18 is easily removed and installed upon the support unit 16, toy 12 may be provided with multiple drums having obstacles 96 forming any one of a variety of pathways or roadways ranging from extremely simple pathways to very difficult pathways. Preferably, as shown in FIG. 1, rack 92 is offset between the lateral edges of drum 18 in order to ensure that drum 18 is properly placed upon support unit 16. More particularly, if drum 18 is placed upon support unit 16 in the wrong direction, the rack 92 will not line up with pinion 108 and pinion 108 will thus not be capable of driving rack 92 and drum 18, thereby notifying a user that the drum 18 is on backwards.

Figure 9:
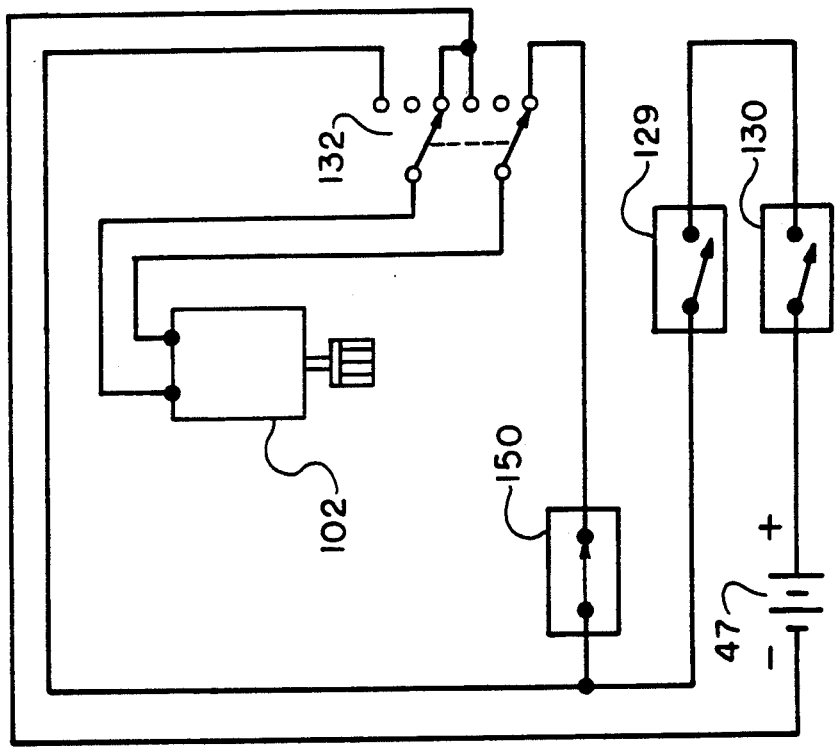
FIG. 9 is an electrical schematic for the toy of FIG. 1.

Referring now to FIG. 9, there is shown an electrical schematic illustrating the circuit formed by motor 102, battery 47, and switches 129, 130, 132, and 150. This circuit allows the electrical motor 102 to selectively drive the drum 18 in a first (forward or counterclockwise) and a second (reverse or clockwise) direction, and it prevents the drum 18 from continuing to rotate in the first (forward or clockwise) direction when the pin 139 of the toy car 21 contacts an obstacle 96, while at the same time allowing the direction of the drum 18 to be reversed thereby allowing a user to disengage the toy car 21 and pin 139 from the obstacle 96, and then steer or maneuver around the obstacle 96.

Preferably, as shown in FIG. 3A pin 139 comprises a pivot pin mounting 190 located within toy car 21 which allows the pin 139 to pivot approximately 90 degrees from its normal position wherein the pin 139 is perpendicular to the major axis of the toy car 21 as shown in FIG. 3. Thus, when the drum 18 is rotated in a forward or counterclockwise direction while a user is attempting to disengage an obstacle 96, the pin 139 will not obstruct the forward or counterclockwise rotation of the drum 18 in the event the pin 139 contacts an obstacle 96 during such counterclockwise rotation.

Although a user when competing with other persons using toy 12 may count the laps or number of revolutions of drum 18 manually, and such users may also monitor the time involved in completing one or more laps using an extraneous device such as a stopwatch or wristwatch, it will be appreciated that toy 12 may be outfitted to include an electronic lap counter and an electronic time keeping device. Such electrical devices may include digital displays mounted on housing 100 at the location generally indicated by numeral 160 in FIG. 2. Such digital displays would serve to simulate the instrument panel of an automobile.

Preferably, all of the elements which comprise toy 21, exclusive of the electrical components, are produced using a suitable thermoplastic. However, it will be appreciated that any one of a variety of materials may be utilized. It will also be appreciated that the present invention is not limited to a device for use upon a user's forearm. More particularly, the present invention contemplates structural modifications to the toy which would allow the toy to stand freely upon a table or other horizontal surface, or allow a user to grasp the toy with the palm of a user's hand.

Furthermore, it will be appreciated that the present invention contemplates the use of alternative electrical power sources and is not limited to the disclosed battery. For example, the present invention also contemplates the use of household current that has been properly rectified and stepped down in voltage to accommodate motor 102.

Additionally, it will be appreciated that the present invention is not limited to a toy or device for simulating the driving skills of a user and that the principles of the present invention may be applied to various other types of devices, machines or applications.

Although the invention has been shown and described with respect to a certain preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed:

1. A toy for testing and simulating the driving skills of a user comprising:
   a support unit for removably mounting said toy upon a limb of the user;
   a circular drum removably mounted for rotation upon said support unit;
   a travel path formed upon the outer diameter of said drum;
   a travel element positioned above said drum;
   control means for altering the position of said travel element relative to said travel path;
   motor means for rotating said drum in a first direction and an opposite second direction relative to said support unit; and
   circuit means for selectively controlling the rotational direction of said motor means.

2. A toy for testing and simulating the driving skills of a user as set forth in claim 1 wherein said support unit comprises a circular axle upon which said drum is mounted for rotation, said axle having an opening into which the limb of a user may be inserted.

3. A toy for testing and simulating the driving skills of a user as set forth in claim 2 wherein said axle includes a battery compartment and a removable access cover for providing access to the inside of said battery compartment.

4. A toy for testing and simulating the driving skills of a user as set forth in claim 3 wherein said support unit further includes an end cap assembly having a pivoting end cap that may be pivoted down to allow the removal of said drum from said axle and pivoted up in order to help retain said drum upon said axle.

5. A toy for testing and simulating the driving skills of a user as set forth in claim 3 wherein said axle includes a protruding tab to releasably secure said pivoting end cap to said axle.

6. A toy for testing and simulating the driving skills of a user as set forth in claim 5 wherein said battery compartment is mounted at one of its end portions along the inner edge of said axle and said end cap assembly is mounted to said other opposite end portion of said battery compartment.

7. A toy for testing and simulating the driving skills of a user as set forth in claim 6 wherein said inner edge of said axle and said pivoting end cap include an upstanding rim to retain said drum upon said axle.

8. A toy for testing and simulating the driving skills of a user as set forth in claim 7 wherein said travel path is formed upon said drum by a plurality of protruding obstacles mounted upon the outer surface of said drum.

9. A toy for testing and simulating the driving skills of a user as set forth in claim 8 wherein said control means comprises a steering assembly including a steering rack upon which said travel element is mounted, a steering pinion gear and a steering wheel attached to said pinion gear, said steering pinion gear and said steering wheel serving to control the relative position of said rack.

10. A toy for testing and simulating the driving skills of a user as set forth in claim 9 wherein said rack is capable of pivoting rearwardly from a first position when said travel element contacts an obstacle.

11. A toy for testing and simulating the driving skills of a user as set forth in claim 10 wherein said circuit means includes a switch for electrically disabling said motor when said rack pivots rearwardly.

12. A toy for testing and simulating the driving skills of a user as set forth in claim 11 wherein said circuit means includes a switch for electrically terminating the rotation of said motor in said first direction when said travel element contacts one of said obstacles and said steering rack pivots rearwardly.

13. A toy for testing and simulating the driving skills of a user as set forth in claim 12 wherein said circuit means further includes a second switch for electrically energizing said motor means alternatively in either said first or said second direction of rotation.

14. A toy for testing and simulating the driving skills of a user as set forth in claim 13 wherein said rack is maintained in said first position by a spring assembly.

15. A toy for testing and simulating the driving skills of a user as set forth in claim 14 wherein said circuit means includes a third switch which is normally biased off, said third switch partially completing the electrical circuit to said motor by depressing said steering wheel.

16. A toy for testing and simulating the driving skills of a user as set forth in claim 15 wherein said circuit means further includes a fourth switch for partially completing the electrical circuit to said motor.

17. A toy for testing and simulating the driving skills of a user as set forth in claim 16 wherein said fourth switch simulates the ignition switch of an automobile and said travel element comprises a toy car.

18. A toy for testing and simulating the driving skills of a user as set forth in claim 17 wherein said motor includes a pinion gear and said drum includes a continuous rack along its inside diameter that is driven by said pinion gear of said motor upon the placement of said drum upon said axle.

* * * * *